US010892509B2

United States Patent
Myers et al.

(10) Patent No.: US 10,892,509 B2
(45) Date of Patent: Jan. 12, 2021

(54) COMPRESSION APPARATUS FOR FUEL CELL STACK

(71) Applicant: BALLARD POWER SYSTEMS INC., Burnaby (CA)

(72) Inventors: David Myers, Vancouver (CA); George Skinner, New Westminster (CA); Emerson R. Gallagher, Vancouver (CA)

(73) Assignee: BALLARD POWER SYSTEMS INC., Burnaby (CA)

( * ) Notice: Subject to any disclaimer, the term of this patent is extended or adjusted under 35 U.S.C. 154(b) by 321 days.

(21) Appl. No.: 15/580,919

(22) PCT Filed: Jun. 13, 2016

(86) PCT No.: PCT/US2016/037265
§ 371 (c)(1),
(2) Date: Dec. 8, 2017

(87) PCT Pub. No.: WO2016/205139
PCT Pub. Date: Dec. 22, 2016

(65) Prior Publication Data
US 2018/0316039 A1    Nov. 1, 2018

Related U.S. Application Data

(60) Provisional application No. 62/182,274, filed on Jun. 19, 2015.

(51) Int. Cl.
*H01M 8/248*    (2016.01)
*H01M 8/1018*   (2016.01)

(52) U.S. Cl.
CPC .... *H01M 8/248* (2013.01); *H01M 2008/1095* (2013.01)

(58) Field of Classification Search
CPC ..................................................... H01M 8/248
See application file for complete search history.

(56) References Cited

U.S. PATENT DOCUMENTS

| 3,134,697 A | 5/1964  | Niedrach      |
| 3,297,490 A | 1/1967  | Barber et al. |
| 4,057,479 A | 11/1977 | Campbell      |
| 4,214,969 A | 7/1980  | Lawrence      |
| 4,478,917 A | 10/1984 | Fujita et al. |

(Continued)

FOREIGN PATENT DOCUMENTS

| CN | 1761094 A   | 4/2006 |
| CN | 103199296 A | 7/2013 |

(Continued)

*Primary Examiner* — Jayne L Mershon
(74) *Attorney, Agent, or Firm* — Seed Intellectual Property Law Group LLP

(57) ABSTRACT

A fuel cell stack assembly is disclosed comprising: a fuel cell stack comprising a first end plate, a second end plate, and a plurality of fuel cells interposed between the first and the second end plates; and a compression band which urges the first end plate towards the second end plate along a first face of the fuel cell stack and also along an opposing second face of the fuel stack in a stacking direction thereof in at least two passes on each face of fuel cells stack, thereby applying a compressive force upon the plurality of fuel cells in the fuel cell stack.

14 Claims, 4 Drawing Sheets

(56) References Cited

U.S. PATENT DOCUMENTS

| | | |
|---|---|---|
| 5,486,430 A | 1/1996 | Gorbell et al. |
| 5,789,091 A * | 8/1998 | Wozniczka ........... H01M 8/247 |
| | | 429/470 |
| 5,993,987 A * | 11/1999 | Wozniczka ........... H01M 8/247 |
| | | 429/470 |
| 2006/0246331 A1* | 11/2006 | Steinbroner ........ H01M 8/2475 |
| | | 429/416 |
| 2010/0159345 A1* | 6/2010 | Shibata ................ H01M 8/248 |
| | | 429/470 |
| 2011/0086292 A1 | 4/2011 | Ko et al. |

FOREIGN PATENT DOCUMENTS

| | | |
|---|---|---|
| CN | 104064802 A | 9/2014 |
| WO | 2013/134789 A2 | 9/2013 |

* cited by examiner

COMPRESSION APPARATUS FOR FUEL CELL STACK

BACKGROUND

Technical Field

The present disclosure relates to a fuel cell stack assembly and, more specifically, to a fuel cell stack assembly compressed by one or more compression bands.

Description of the Related Art

Fuel cells convert fuel and oxidant to electricity and reaction product. Solid polymer electrochemical fuel cells generally employ a membrane electrode assembly (MEA) consisting of a polymer electrolyte membrane (PEM) (or ion exchange membrane) disposed between two electrodes comprising porous, electrically conductive sheet material and an electrocatalyst disposed at each membrane/electrode layer interface to induce the desired electrochemical reaction.

In typical fuel cells, the MEA is disposed between two electrically conductive separator or fluid flow field plates. Fluid flow field plates have at least one flow passage formed therein to direct the fuel and oxidant to the respective electrodes, namely, the anode on the fuel side and the cathode on the oxidant side. In a single cell arrangement, fluid flow field plates are provided on each of the anode and cathode sides. The plates also act as current collectors and provide mechanical support for the electrodes.

Two or more fuel cells can be connected together in series to form a fuel cell stack to increase the overall voltage of the assembly. In a fuel cell stack, one side of a given plate serves as an anode plate for one cell and the other side of the plate can serve as the cathode plate for the adjacent cell.

The fuel cell stack typically further includes manifolds and inlet ports for directing the fuel and the oxidant to the anode and cathode flow field passages respectively. The fuel cell stack also usually includes a manifold and inlet port for directing a coolant fluid to interior passages within the fuel cell stack to absorb heat generated by the exothermic reaction in the fuel cells. The fuel cell stack also generally includes exhaust manifolds and outlet ports for expelling the unreacted fuel and oxidant gases, as well as an exhaust manifold and outlet port for the coolant stream exiting the fuel cell stack.

Typically, the fuel cell stack is either liquid-cooled or air-cooled. In liquid-cooled stacks, a liquid, typically water or a mixture of water and glycol, is the cooling medium that is circulated through the stack to control its temperature. Fuel and oxidant, such as air, is provided at relatively high pressures. Fuel is typically provided from a high pressure tank with a pressure regulator while air is provided through an air compressor. In air-cooled stacks, however, air serves as a reaction gas as well as the cooling medium. One advantage for air-cooled stacks is that air is supplied at a lower pressure by an air supply fan instead of a high pressure compressor, which eliminates the need for the compressor and a separate cooling system. To cool the fuel cell stack in air-cooled stacks, the air flow needs to be much higher than in a liquid-cooled system, which necessarily leads to very large air flow channels through the fuel cell. As shown in FIG. 1, a typical air-cooled stack 10, such as the FCgen®-1020ACS fuel cell stack provided by Ballard Power Systems, has an open cathode design, meaning that the large air channels 2 are open to ambient and not hermetically sealed as in conventional liquid-cooled fuel cell stack designs.

In conventional fuel cell stack assembly designs, such as, for example, those described and illustrated in U.S. Pat. Nos. 3,134,697, 3,297,490, 4,057,479, 4,214,969 and 4,478,917, the plates which make up each conventional fuel cell assembly are compressed and maintained in their assembled states by tie rods. The tie rods extend through holes formed in the peripheral edge portion of the stack end plates and have associated nuts or other fastening means assembling the tie rods to the stack assembly and compressing the end plates of the fuel cell stack assembly toward each other. Typically, the tie rods are external; that is, they do not extend through the fuel cell separator or flow field plates. One reason for employing a peripheral edge location for the tie rods in conventional designs is to avoid the introduction of openings in the central, electrochemically active portion of the fuel cells.

The peripheral edge location of the tie rods in conventional fuel cell designs, however, has inherent disadvantages. It requires that the thickness of the end plates be substantial in order to evenly transmit the compressive force across the entire area of the plate. Also, the peripheral location of the tie rods can induce deflection of the end plates over time if they are not of sufficient thickness. Inadequate compressive forces can compromise the seals associated with the manifolds and flow fields in the central regions of the interior plates, and also compromise the electrical contact required across the surfaces of the plates and MEAs to provide the serial electrical connection among the fuel cells which make up the stack. End plates of substantial thickness however, contribute significantly to the overall weight and volume of the fuel cell stack, which is particularly undesirable in motive fuel cell applications. Also, when external tie rods are employed, each of the end plates must be greater in area than the stacked fuel cell assemblies. The amount by which the end plates protrude beyond the fuel cell assemblies depends on the thickness of the tie rods, and more importantly on the diameter of the washers, nuts and any springs threaded on the ends of tie rods, since preferably these components should not overhang the edges of end plate. Thus the use of external tie rods can increase stack volume significantly.

Various designs in which one or more rigid compression bars extend across each end plate, the bars being connected (typically via external tie rods and fasteners) to corresponding bars at the opposite end plate have been employed in an effort to reduce the end plate thickness and weight, and to distribute compressive forces more evenly. Such a design is described and illustrated in U.S. Pat. No. 5,486,430.

The fuel cell stack compression mechanisms described above typically utilize springs, hydraulic or pneumatic pistons, pressure pads or other resilient compressive means which cooperate with the tie rods, which are generally substantially rigid, and end plates to urge the two end plates towards each other to compress the fuel cell stack. These compression mechanisms undesirably add weight and/or volume and complexity to the fuel cell stack.

Other methods of compression that eliminate the use of tie rods are described in U.S. Pat. Nos. 5,789,091 and 5,993,987, which disclose a mechanism for securing the stack in its compressed, assembled state that includes at least one compression band which circumscribes the end plate assemblies and interposed fuel cell assemblies in stacks. However, for air-cooled fuel cell stacks, such compression bands may block the flow of air to the large air channels, thus reducing performance of the fuel cell stack. It is desirable to have a fuel cell stack with reduced weight, volume and complexity, resulting in increased power density, efficiency and reduced cost. The present disclosure addresses these and associated benefits.

BRIEF SUMMARY

One embodiment may be summarized as a fuel cell stack assembly comprising: a fuel cell stack comprising a first end plate, a second end plate, and a plurality of fuel cells interposed between the first and the second end plates; and a compression band, wherein the compression band urges the first end plate towards the second end plate along a first face of the fuel cell stack in a stacking direction thereof, the compression band urging the first end plate towards the second end plate in at least two passes; and the compression band urges the first end plate towards the second end plate along an opposing second face of the fuel cell stack in the stacking direction thereof, the compression band urging the first end plate towards the second end plate in at least two passes, thereby applying a compressive force upon the plurality of fuel cells.

In preferred embodiments, at least one first protrusion extends outwardly on the first face of the fuel cell stack from a peripheral edge of at least one of the first end plate and second end plate and at least one second protrusion extends outwardly on the opposing second face of the fuel cell stack from the peripheral edge of at least one of the first end plate and the second end plate. The compression band urges the first end plate toward the second end plate along the first face of the stack in at least two passes via the at least one protrusion and the compression band urges the first end plate towards the second end plate along the opposing second face of the stack in at least two passes via the at least one second protrusion.

The first and second protrusions can each comprise a groove that comes into contact with the compression band, such that the compression band is located at least partially within the groove.

The compression band can be a wire, a strap, a string, a cable or a rope.

The compression band material is selected from the group consisting of steel, polymer-coated steel, metal, polymer-coated metal, ultra-high-molecular-weight polyethylene, aramid fibers and glass fibers. The compression band can be made of a non-electrically conductive material or it can be coated with a non-electrically conductive material.

In preferred embodiments, the compression band has a width of less than about 1.0 millimeter. For compression bands having a round shape, the diameter of the band is preferably less than about 1.0 millimeter. Each terminal end of the compression band is attached to one of the first and second end plates.

In preferred embodiments, the terminal end of the compression band sits in a groove provided on the first and second end plate, and it is retained in the groove by a flat-bottomed compression member which is tightened against the compression band to secure the terminal end to the first and second end plate. The flat-bottomed compression member can be a screw or a rivet. In some embodiments, the compression band is wrapped around a post and in other preferred embodiments having a non-threaded flat-bottomed compression members or a flat-bottomed compression members that has a non-threaded portion, the compression band is wrapped around the flat-bottomed compression member.

A method is disclosed for compressing a fuel cell stack assembly, the fuel cell stack assembly comprising a fuel cell stack, the fuel cell stack comprising a first end plate, a second end plate, and a plurality of fuel cells interposed between the first and the second end plates, wherein the method comprises: providing a compression band for urging the first end plate toward the second end plate along a first face and along an opposing second face of the fuel cell stack in a stacking direction thereof, wherein the compression band urges the first end plate to the second end plate in at least two passes on each of the first and second faces; and providing tension to the compression band to urge the first end plate toward the second end plate, thereby applying compressive force upon the plurality of fuel cells.

In preferred embodiments, the method further comprises providing at least one protrusion extending outwardly from a peripheral edge of at least one of the first and second end plates along each of the first face and opposing second face of the fuel cell stack, and urging the first end plate toward the second end plate with the compression band in at least two passes via the protrusions extending along the first and the opposing second face of the fuel cell stack.

In yet another embodiment, a fuel cell stack assembly comprises: a fuel cell stack comprising a first end plate, a second end plate, and a plurality of fuel cells interposed between the first and the second end plates; a first compression band urging the first end plate toward the second end plate along a first face of the fuel cell stack in a stacking direction thereof, the first compression band urging the first end plate toward the second end plate in at least two passes; and a second compression band urging the first end plate toward the second end plate along an opposing second face of the fuel cell stack in a stacking direction thereof, the second compression band urging the first end plate toward the second end plate in at least two passes; thereby applying a compressive force upon the plurality of fuel cells.

The fuel cell stack assembly can further comprise at least one first protrusion extending outwardly on the first face of the fuel cells stack from a peripheral edge of at least one of the first end plate and the second end plate, and at least one second protrusion extending outwardly on the opposing second face of the fuel cell stack from the peripheral edge of at least one of the first end plate and the second end plate, wherein the first compression band urges the first end plate toward the second end plate along the first face of the stack in at least two passes via the at least one first protrusion, and the second compression band urges the first end plate towards the second end plate along the opposing second face of the stack in at least two passes via the at least one second protrusion.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments of the invention.

Unless the context requires otherwise, throughout the specification and claims which follow, the word "comprise" and variations thereof, such as "comprises" and "comprising" are to be construed in an open, inclusive sense, that is, as "including but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure a "pass" means that the band extends generally vertically in the stacking direction of the fuel cell stack from the first end plate to the second end plate along a planar face of the fuel cell stack. Accordingly, for embodiments where each of the first and the second end plates comprise at least a protrusion extending outwardly from the peripheral edge of the end plate, a "pass" means that the band extends generally vertically in the stacking direction of the fuel cell stack from a protrusion on the first end plate to a protrusion on the second end plate along a planar face of the fuel cell stack.

Figure 2:
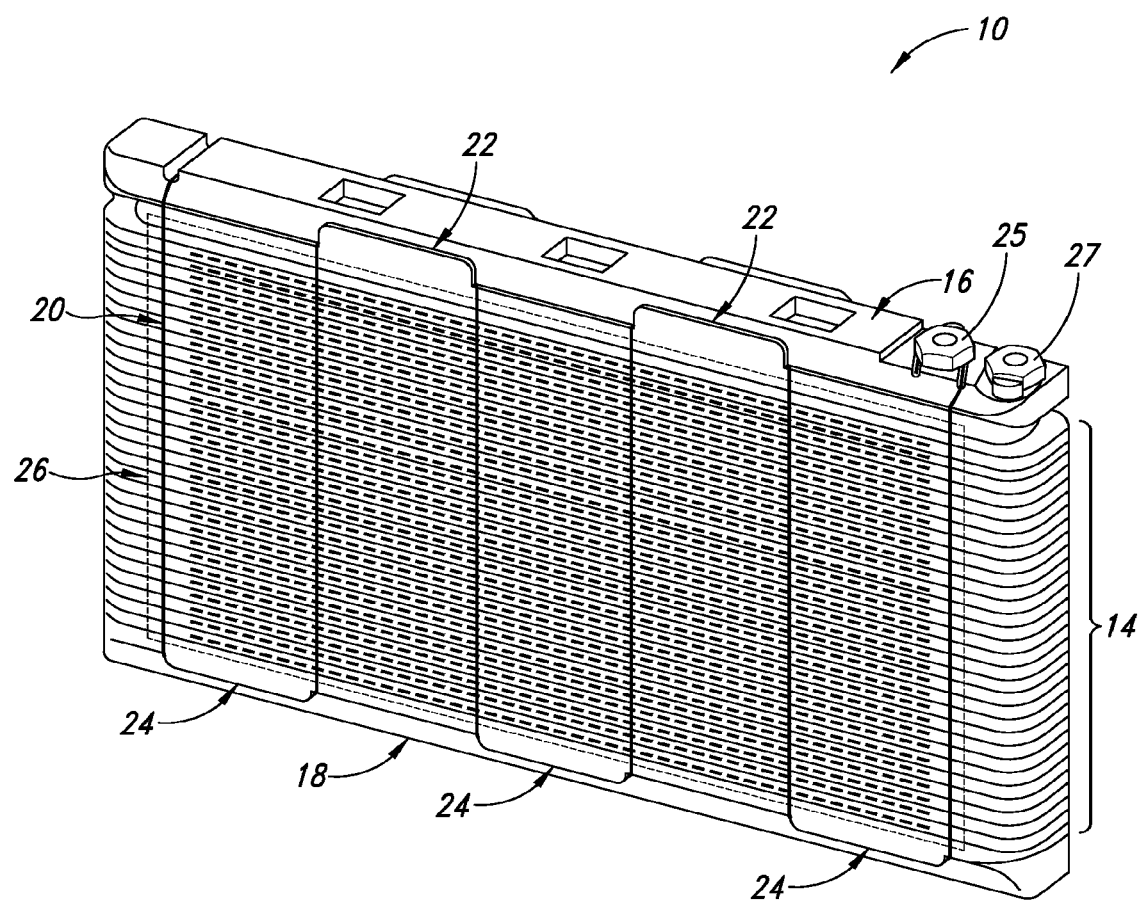
FIG. 2 is an isometric view of an air-cooled fuel cell stack according to one embodiment.

FIG. 2 illustrates a fuel cell stack assembly according to one embodiment. Fuel cell stack assembly 10 comprises a plurality of fuel cells that form a fuel cell stack 14. Each fuel cell includes a membrane electrode assembly interposed between an anode flow field plate and a cathode flow field plate. First and second end plates 16, 18 are situated on opposite sides of the fuel cell stack. A single compression band 20 urges first and second end plates 16, 18 towards each other, thereby providing a compressive force to the fuel cells in fuel cell stack 14 in the stacking direction of the fuel cells.

In the illustrated embodiment, compression band 20 wraps around protrusions 22, 24 extending outwardly from the peripheral edge of end plates 16, 18 in a number of passes (i.e., generally vertically in the stacking direction of the fuel cell stack from a protrusion 22 on first end plate 16 to a protrusion 24 on second end plate 18) along first planar face 26 (indicated by the dotted lines) of fuel cell stack 14. Compression band 20 then goes over first end plate 16 at one end thereof, more specifically over the surface of the first end plate that is opposite to the surface of the first end plate that is facing the fuel cell stack, and then wraps around the protrusions extending outwardly from the peripheral edge of end plates 16, 18 in a number of passes along the opposing second planar face (not shown) of fuel cell stack 14. In some other embodiments, not illustrated, the compression band could go over second end plate 18 to reach the opposing second planar face of the fuel cell stack instead of going over first end plate 16 as illustrated in FIG. 2. Upon providing tension, a single compression band 20 compresses, retains and secures fuel cell stack 14 in its assembled state.

In one embodiment, only one protrusion 24 is provided, for example, on the second end plate, along the first planar surface 26 of the stack, extending outwardly from the second end plate and only one protrusion is provided on the second end plate along the opposing second planar face of the fuel cell stack and extending outwardly from the second end plate. In this embodiment, the compression band 20 wraps around the first protrusion and extends along the first planar surface in the stacking direction of the fuel cell stack in two passes, goes over the first end plate and wraps around the second protrusion extending along the second planar surface of the stack in the stacking direction of the fuel cell stack in two passes to provide the tension in the band that compresses the stack. As in the previous embodiments, in this embodiment, the ends of the compression band are fixed to the end plate or to the compression hardware of the stack, more specifically, in the described embodiment, the ends of the compression band are fixed to the first end plate 16.

In another embodiment, two compression bands may be used for compression, one along each opposing planar face of the stack. In this embodiment, the compression band does not need to go over the end plate, as in the first embodiment. Such embodiments are preferred for automating the fuel cell stack assembly process.

There are a number of advantages by using a single compression band or one compression band on each side of the stack that wrap around protrusions extending out of the stack in a number of passes along the planar faces of the stack to compress the stack. First, the stack assembly is simplified in that the compression band does not need to wrap multiple times around the end plates of the stack, which is more difficult to assemble, as the compression band needs to pass through between the compression fixture that is holding the stack and the stack itself. Secondly, if a non-electrically conductive compression band material is used, no spatial clearance is required between the stack and the compression band, which reduces the overall volume of the stack. Thirdly, by using a single compression band or one compression band on each opposing longitudinal face of the stack, uniform compression between the inlet and outlet ends of the stack can be more easily achieved because tension is applied to a single compression band rather than a large number of compression bands or tie rods, as in the prior art. All of these advantages lead to decreased manufacturing costs.

Figure 1:
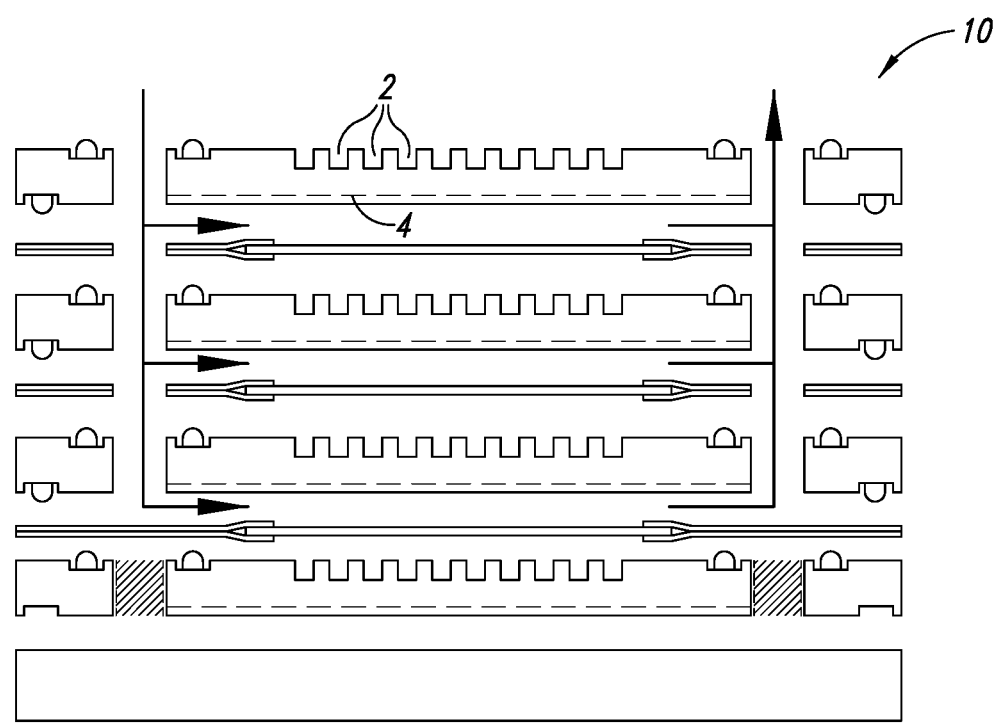
FIG. 1 is an expanded cross-sectional view of an air-cooled fuel cell stack.

Such a configuration of a single compression band or one compression band on each opposing longitudinal face of the stack can be used for any fuel cell stack. In particular, this configuration may be useful for applications where size of the stack is limited, such as those used for portable handheld devices. Such small stacks may produce about 100 watts of power or less. In the embodiments described in the foregoing, the fuel cell stack is an air-cooled stack with open air channels, as shown in FIG. 1. Fuel manifolds are formed internally in fuel cell stack assembly 10 to supply fuel to each of the anode flow field channels 4 while open air channels 2 are connected to external air, which is typically provided via a fan or air compressor (not shown). By using a thin compression band, such as a string or rope, the open air channels are not significantly blocked.

The amount of stack compression exerted by the tension of the compression band will depend on application. For example, the inventors have discovered that the stack can be compressed to about 30 PSI to 70 PSI, preferably up to 10 years shelf life, using a single compression band.

The compression band may be any suitable flexible form, such as a wire, strap, string, cable, or rope. As mentioned in the foregoing, a thinner band may be desirable for air-cooled stacks with open air channels so that they do not significantly block air from going into and out of the stack. In some embodiments, the compression band may be about 0.5 millimeters to about 1.0 millimeters in diameter or width.

The compression band material may be any suitable material, such as metal, polymer-coated metal, steel, polymer-coated steel, glass fibre, aramid fibres (such as Kevlar®), ultra-high-molecular-weight polyethylene (UHMWPE) or other high-modulus material. As mentioned in the foregoing, if the compression band will be in physical contact with or in close proximity to the fuel cells, the compression band is made preferably of a non-electrically conductive material or it is coated with a non-electrically conductive material to prevent electrical shorting of the stack.

Protrusions 22, 24 may protrude in any outwardly direction from the peripheral edge of end plates 16, 18, so long as compression band 20 can wrap therearound in a number of passes along opposing longitudinal faces of the fuel cell stack. Protrusions 22, 24 may be any suitable shape and size as determined by one skilled in the art, typically based on the desired stack compression and strength of the protrusion material, and may also comprise grooves or ridges to accommodate and/or provide friction for compression band 20.

The ends of compression band 20 may be attached to the stack in any suitable manner. For example, the ends of compression band 20 may be attached to one of the end-plates and/or compression hardware with metal compression sleeves, knots or adhesives. In one embodiment, the ends of compression band 20 are attached to the end plate by melt-bonding a small portion of the end plate material to the ends of the compression band. When one compression band is used for multiple passes along both planar faces of the fuel cell stack both ends can be, for example, attached to first end plate 16 through attaching fixtures 25 and respectively 27, as illustrated in FIG. 2, or both ends can be attached to the same fixture. Alternatively, one end of the compression band 20 can be attached to the first end plate 16 and the other end of the compression band 20 can be attached to the second end plate 18. Similarly, if two compression bands are used, each for one planar side face of the fuel cell stack, both ends of each compression band can be attached to the same end plate or one end of each compression band can be attached to an end plate while the other end of the compression band can be attached to the other end plate.

Figure 3:
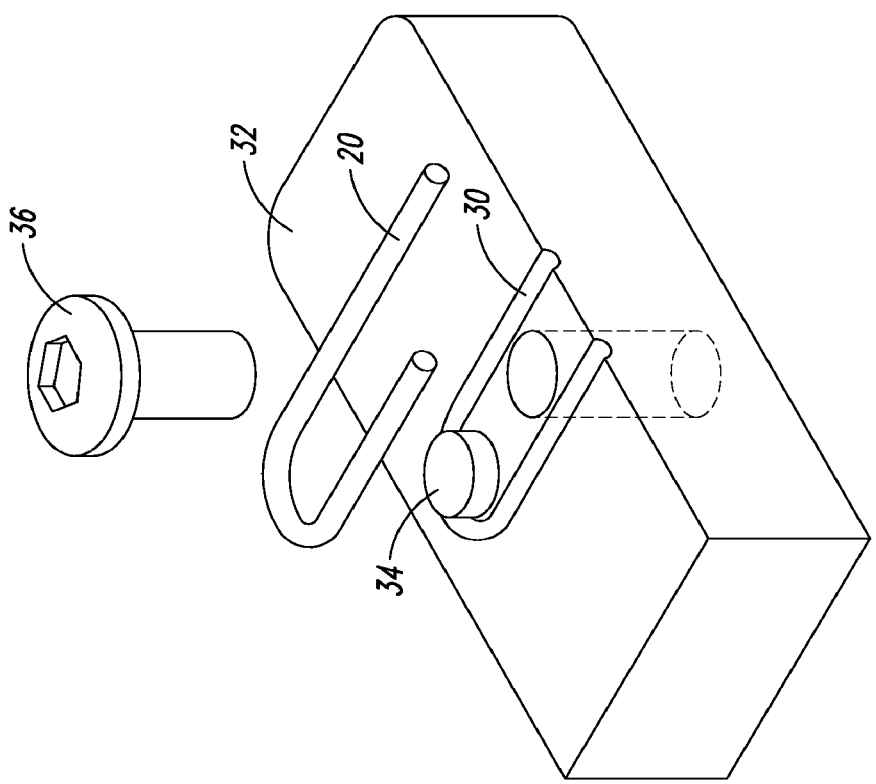
FIG. 3 is an isometric view of the fastening mechanism for attaching the ends of the compression band to the end plate of the fuel cell stack.

In another embodiment, the ends of compression band 20 are attached to and compressed against the stack with a flat-bottomed compression member, such as a screw head, washer, or rivet, as shown in FIG. 3. A compression band groove 30 is formed on end plate 32. Compression band 20 sits in groove 30 and loops around post 34. Flat-bottomed compression member 36 is then tightened against compression band 20 to retain or secure compression band 20. In some embodiments, the flat-bottomed compression member is not threaded, or has an unthreaded portion adjacent to the flat bottom, and, in such embodiments, the compression band wraps directly around the flat-bottomed compression member 36 instead of been wrapped around the post 34 and then compression member is tightened against the band to retain it in a secure position. In such embodiments a post 34 is not necessary. In embodiments where the flat-bottomed compression member has a non-threaded portion and a threaded portion, and the compression band wraps around the non-threaded portion, it is preferred that the compression band does not come into contact with the threaded portion of the compression member to prevent the deformation or damage of the compression band.

The cross-section of groove 30 should be chosen such that flat-bottomed compression member 36 compressing compression band 20 can generate enough friction between compression band 20 and groove 30 to significantly exceed one-half of the cable tension, as well as ensure that compression band 20 does not unwind, splay or otherwise deform in a way that would result in a loss of compression pressure over time. Flat-bottomed compression member 36 should also compress against compression band 20 at two positions, (e.g., before and after looping around post 34).

While not specifically shown, the first and second end-plates may comprise additional components, such as ports, seals, bus plates, mounting points, and compliant materials, such as springs.

Figure 4:
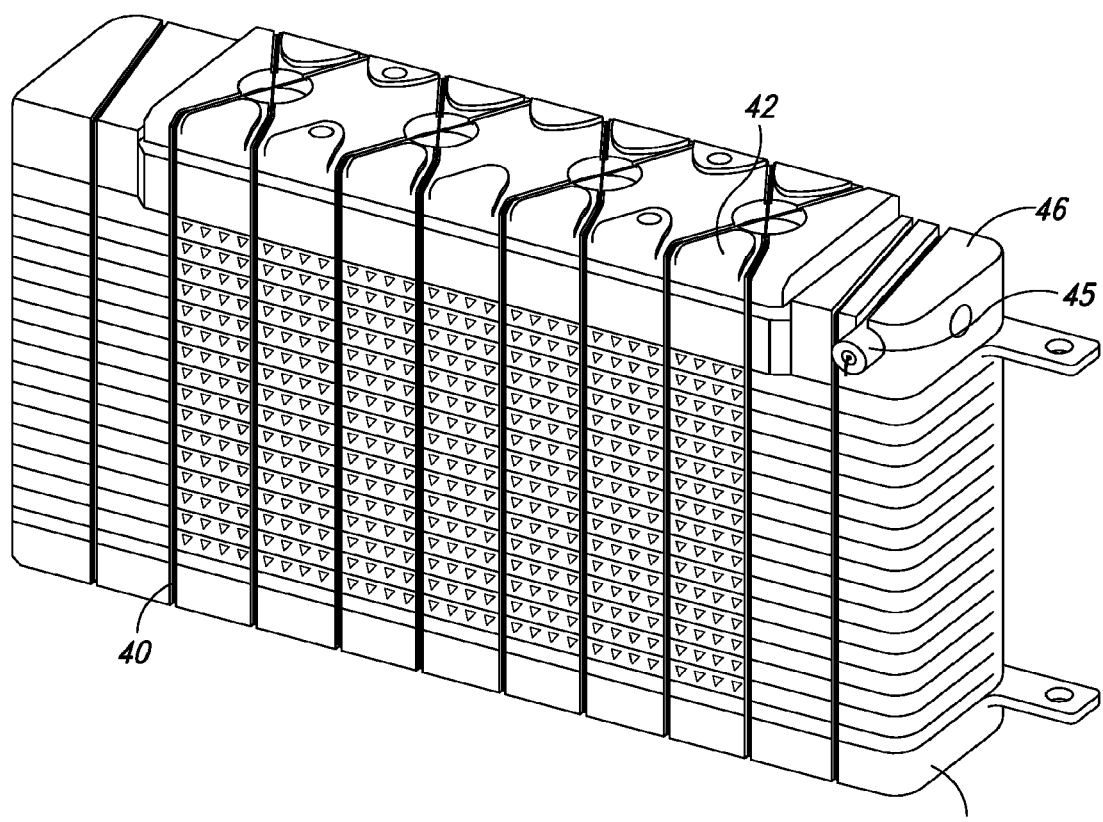
FIG. 4 is an isometric view of an air-cooled fuel cell stack according to another embodiment.

If the fuel cell stack is much larger, it may become impractical wrap the compression band around the protrusions along the two planar faces of the fuel cell stack because the protrusion and cable sizes become too large. In such a situation, as shown in FIG. 4, a single compression band 40 may be used to wrap around the stack and the end plates in multiple passes. One end of the compression band 40 is fixed to the first end plate 46 through first attaching fixture 45 and the other end of the compression band 40 is fixed to the first plate 46 or to the second plate 48 through a second attaching fixture (not illustrated). First end plate 46 and second end plate 48 are each shaped with guides 42 for guiding the compression band 40 as it wraps around the fuel cell stack.

In other embodiments, two compression bands can be used instead of one compression band 40, such that each of the compression bands wraps around the stack in multiple passes.

While only PEM fuel cells have been disclosed, the present description is applicable to other types of fuel cells as well, such as direct methanol fuel cells, and flow batteries.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. To the extent that they are not inconsistent with the specific teachings and definitions herein, all of the above U.S. patents, U.S. patent application publications, U.S. patent applications, foreign patents, foreign patent applications and non-patent publications referred to in this specification and/or listed in the Application Data Sheet are incorporated herein by reference, in their entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

This application also claims the benefit of U.S. Provisional Patent Application No. 62/182,274, filed Jun. 19, 2015, and is incorporated herein by reference in its entirety.

What is claimed is:

1. A fuel cell stack assembly comprising:
a fuel cell stack comprising a first end plate, a second end plate, and a plurality of fuel cells interposed between the first and the second end plates;
a first continuous compression band that urges the first end plate towards the second end plate in at least two passes along a first face of the fuel cell stack in a stacking direction thereof, the first continuous compression band stretching from a first end of the first end plate along the first face of the fuel cell stack to a second end of the first end plate opposite the first end of the first end plate across the first face of the fuel cell stack or from a first end of the second end plate along the first face of the fuel cell stack to a second end of the second end plate opposite the first end of the second end plate across the first face of the fuel cell stack; and a second continuous compression band that urges the first end plate towards the second end plate in at least two passes along an opposing second face of the fuel cell stack in the stacking direction thereof, the second continuous compression band stretching from the first end of the first end plate along the second face of the fuel cell stack to the second end of the first end plate opposite the first end of the first end plate across the second face of the fuel cell stack or from the first end of the second end plate along the second face of the fuel cell stack to the second end of the second end plate opposite the first end of the second end plate across the second face of the fuel cell stack;

the first and second continuous compression bands thereby applying a compressive force upon the plurality of fuel cells to secure the compression of the entire fuel cell stack in its assembled state.

2. The fuel cell stack assembly of claim 1, further comprising:

at least one first protrusion extending outwardly on the first face of the fuel cell stack from a peripheral edge of at least one of the first end plate and the second end plate; and at least one second protrusion extending outwardly on the opposing second face of the fuel cell stack from the peripheral edge of at least one of the first end plate and the second end plate;

wherein the first continuous compression band urges the first end plate toward the second end plate along the first face of the stack in at least two passes via the at least one first protrusion; and the second continuous compression band urges the first end plate towards the second end plate along the opposing second face of the stack in at least two passes via the at least one second protrusion.

3. The fuel cell stack assembly of claim 2, wherein the first protrusion includes a first groove for the first continuous compression band and the second protrusion includes a second groove for the second continuous compression band.

4. The fuel cell stack assembly of claim 1, wherein the first continuous compression band and the second continuous compression band are each in the form of a wire, a strap, a string, a cable, or a rope.

5. The fuel cell stack assembly of claim 1, wherein the first continuous compression band and the second continuous compression band are each made from a material selected from the group consisting of: metal, polymer-coated metal, steel, polymer-coated steel, ultra-high-molecular-weight polyethylene, aramid fibers, and glass fibers.

6. The fuel cell stack assembly of claim 1, wherein the first continuous compression band and the second continuous compression band are each non-electrically conductive or coated with a non-electrically conductive material.

7. The fuel cell stack assembly of claim 1, wherein the first continuous compression band and the second continuous compression band each have a width of less than about 1.0 millimeter.

8. The fuel cell stack assembly of claim 1, wherein the first continuous compression band and the second continuous compression band each have a diameter of less than about 1.0 millimeter.

9. The fuel cell stack assembly of claim 1, wherein each terminal end of each of the first continuous compression band and the second continuous compression band are attached to one of the first and second end plates.

10. The fuel cell stack assembly of claim 9, wherein each terminal end of each of the first continuous compression band and the second continuous compression band sit in a respective groove provided on the first or second end plate, and is retained in the respective groove by a flat-bottomed compression member which is tightened against the respective continuous compression band to secure the terminal end to the first or second end plate.

11. The fuel cell stack assembly of claim 10, wherein the flat-bottomed compression member is a screw or a rivet.

12. The fuel cell stack assembly of claim 10, wherein the first continuous compression band and the second continuous compression band are each wrapped around a respective post or around the respective flat-bottomed compression member.

13. The fuel cell stack assembly of claim 1 wherein the first and second continuous compression bands form a single continuous compression band which secures the compression of the entire fuel cell stack in its assembled state.

14. The fuel cell stack assembly of claim 1, wherein:

the first continuous compression band extends across the first face of the fuel cell stack in the stacking direction and along a first axis perpendicular to the stacking direction; and the second continuous compression band extends across the second face of the fuel cell stack in the stacking direction and along a second axis perpendicular to the stacking direction.

* * * * *